United States Patent
Harnden, Jr.

[11] 3,781,504
[45] Dec. 25, 1973

[54] INDUCTION COOKING APPLIANCE INCLUDING TEMPERATURE SENSING OF INDUCTIVELY HEATED COOKING VESSEL BY RADIATION DETECTION MEANS

[75] Inventor: John D. Harnden, Jr., Schenectady, N.Y.

[73] Assignee: General Electric Company, Schenectady, N.Y.

[22] Filed: Dec. 29, 1971

[21] Appl. No.: 213,351

[52] U.S. Cl............. 219/10.49, 73/355, 219/10.77, 219/502
[51] Int. Cl. ........................................ H05b 5/04
[58] Field of Search............... 219/10.49, 10.77, 219/10.79, 502; 338/18, 19, 11; 73/355, 193 R; 250/83.3 H

[56] References Cited
UNITED STATES PATENTS

| | | | |
|---|---|---|---|
| 3,710,062 | 1/1973 | Peters | 219/10.49 |
| 3,256,417 | 6/1966 | Merrett | 219/10.79 |
| 3,530,499 | 9/1970 | Schroeder | 219/10.49 |
| 3,035,143 | 5/1962 | Leatherman | 219/10.77 |
| 3,626,758 | 12/1971 | Stewart et al. | 73/355 |
| 3,570,277 | 3/1971 | Dorr et al. | 73/355 |
| 3,064,128 | 11/1962 | Duke | 250/83.3 H |
| 3,065,324 | 11/1962 | McNair et al. | 219/10.77 X |
| 3,443,049 | 5/1969 | Hoagland | 219/10.79 X |

FOREIGN PATENTS OR APPLICATIONS
1,157,711  7/1969  Great Britain................... 219/10.49

OTHER PUBLICATIONS

Mapham, "Low Cost, Ultrasonic Frequency Invention," Application Note 200.49, Feb. 1967, General Electric Semiconductors Prod. Dept.

Primary Examiner—Bruce A. Reynolds
Attorney—John F. Ahern et al.

[57] ABSTRACT

Herein disclosed is an induction range having a counter on which there is rested a cooking vessel to be inductively heated by an induction coil having an air core; the induction coil being located below the counter. The counter has a passage therethrough extending from the top, or working, surface thereof, on which the cooking vessel rests, to a lower surface thereof near the induction coil. The passage in the counter and the induction coil's core are in register. A bolometer is situated below the induction coil. The vessel rests on the working surface of the counter and covers the passage so that the bottom of the vessel is in an unobstructed line with the bolometer. The bolometer receives radiant heat energy from the inductively heated vessel and is instrumental in determining the temperature thereof.

8 Claims, 4 Drawing Figures

INDUCTION COOKING APPLIANCE INCLUDING TEMPERATURE SENSING OF INDUCTIVELY HEATED COOKING VESSEL BY RADIATION DETECTION MEANS

CROSS REFERENCES TO RELATED APPLICATIONS

A fuller appreciation of induction cooking appliances as well as some of the sophistications which may be embodied therein is to be had by referring to the following U.S. patent applications: Ser. No. 200,526, filed Nov. 19, 1971, in behalf of David L. Bowers et al., titled SOLID STATE INDUCTION COOKING APPLIANCE Ser. No. 200,424, filed Nov. 19, 1971 in behalf of J.D. Harnden, Jr. et al., titled SOLID STATE INDUCTION COOKING APPLIANCES AND CIRCUITS. The entire right, title, and interest in and to the inventions described in the aforesaid patent applications, as well as in and to the aforesaid applications, and the entire right, title, and interest in and to the invention hereinafter described, as well as in and to the patent application of which this specification is a part, are assigned to the same assignee.

BACKGROUND OF THE INVENTION

This invention pertains to induction cooking, generally; and, more particularly, to an induction cooking appliance including a vessel supporting means, such as a counter, having combined therewith a temperature sensing unit for sensing, or detecting, the temperature of a cooking vessel, or utensil, supported by the vessel supporting means.

Prior art electric ranges (i.e., those employing resistance heater surface elements) and gas ranges present many problems with respect to sensing, or detecting, the temperature of a cooking vessel, or utensil, resting on the range counter and being heated. The following problems are among those presented:

First, with prior art electric and gas ranges, the temperature sensing means and its associated components are directly heated, spuriously, in some measure by a high temperature heating source. For example, in the conventional electric range a temperature sensing unit is situated at the center of a spiral resistance heating coil. The heating coil and temperature sensing unit are both located on the top or working surface of the range counter and a cooking vessel rests on and contacts the heating coil as well as the temperature sensing unit. Although the temperature sensing unit directly contacts the heated cooking vessel, it is also subjected to direct, or spurious, heating by the range's resistance heating coil, e.g., by radiation and convection. In addition, the temperature of the temperature sensing unit is influenced by, among other things, the metallic counter top of the electric range; the temperature sensing unit being mounted on the metallic counter top. Similarly, in a gas range the flames directly heat the temperature sensing unit and heated metallic gridirons as well as the metallic counter top thermally influence the temperature sensing unit. Suffice it to say that: with prior art electric and gas ranges the primary heating source spuriously heats the temperature sensing unit and other heated parts of the range thermally perturb the temperature sensing unit as well.

Second, in prior art electric and gas ranges, because of the nature and proximity of the primary heating source, various component parts of the temperature sensing unit have to be fabricated with materials which are capable of withstanding relatively high temperatures; e.g., approximately 1400°F to 1600°F. For example, in the conventional electric range wherein the temperature sensing unit is situated at the center of a spiral resistance heater coil which is, in turn, mounted in the metallic counter top of the range, the temperature sensing unit and its associated components are subjected to the elevated temperatures hereinbefore set forth and significant thermal stresses are induced in the temperature sensor as well as in its associated components. Clearly, epoxies, plastics, polymides, and untreated glass, among others, are not employable. Similar conditions are presented with gas ranges. Suffice it to say that: because of the relatively high temperatures involved in prior art electric and gas ranges, the materials from which a temperature sensor and its associated components may be fabricated are rather limited.

Third, in prior art electric and gas ranges, principally because of the nature and proximity of the primary heating source, the temperature sensing unit and its associated components are required to have extensive thermal shielding, or insulation, to minimize the influences of spurious heating by the high temperature heating source as well as by the metallic range counter and the gridirons. Without some effective thermal shielding, or insulation, the temperature sensing unit will provide a false temperature indication unless temperature compensation is appropriately applied. Temperature compensation is not feasible, however, because of the wide range of cooking conditions. Moreover, without effective thermal shielding severe thermal stresses induced in the various components of the temperature sensing unit will cause a disabling, and sometimes destruction, of the temperature sensing unit. Suffice it to say that: because of the relatively high temperatures involved in prior art electric and gas ranges the temperature sensing units employed therein require effective thermal shielding or insulation.

Fourth, prior art temperature sensing units, especially those employed in the conventional electric range, are generally rather sophisticated, mechanically, and are of a somewhat complex structure and arrangement. The high temperature environment within which the temperature sensing unit is located permits severe thermal stresses to occur in the various components of the temperature sensing unit. These stresses tend to promote warping of the various components. For example, because of the aforesaid thermal stresses a relatively massive double spring arrangement is employed in combination with a temperature responsive device. The temperature responsive device acting against spring restraint contacts the bottom surface of the cooking vessel which rests, or is seated, on a flat spiral heating coil, as well as on the temperature responsive device, disposed on the top surface of the range counter. The massive double spring arrangement is rather stiff (i.e., has a relatively high restoring force or relatively large effective spring constant) and this is due in large part to the need to make the arrangement structurally resistant to thermal deformation. Such a stiff spring arrangement generally functions satisfactorily to enable the temperature sensing unit to maintain forceful contact with a regular flat bottom surface of a relatively heavy cooking vessel such as a cast iron pot containing foodstuff to be cooked. Being in contact with the bottom surface of the vessel or pot, it is conceptually possible for the temperature sensing unit to detect the temperature of the vessel. However, in the event that a relatively lightweight pot or vessel is used, or if a vessel having a rather irregularly contoured bottom surface is used, such prior art temperature sensing units employing the aforesaid stiff spring arrangement prove to be unsatisfactory. For example, if a cooking vessel is used which is not sufficiently heavy, there will be insufficient weight to adequately compress the spring arrangement and one consequence will be that the vessel will not rest on the resistance heating coil in the most intimate contact possible therewith. The cooking vessel will, as a result, be raised, or tilted, and thereby allow very inefficient heat transfer between the heating coil and the vessel. Suffice it to say: that because of the relatively high temperatures involved and because of the consequent thermal stresses created with such prior art ranges as have been hereinafter described, it is not practical to provide temperature sensing units having simple spring arrangements having little stiffness, or small restoring force.

SUMMARY OF THE INVENTION

Although the invention is hereinafter described and illustrated in the accompanying drawing figures as being embodied in an induction range it is, nevertheless, to be understood that the invention's applicability is not limited to induction cooking ranges but may be embodied in, for example, trivet warmers, portable counter top warming or cooking appliances as well as in other apparatus which need not necessarily be used for cooking food.

One object of the invention herein set forth is the provision of a cooking appliance having a temperature sensing unit for sensing or detecting the temperature of a vessel or utensil being heated and wherein the temperature sensing unit is free from spurious heating.

Another object of the invention herein set forth is the provision of a cooking appliance having a temperature sensing unit for sensing or detecting the temperature of a vessel or utensil being heated, said temperature sensing unit being relatively remote from said heated vessel or utensil.

Another object of the invention herein set forth is the provision of a cooking appliance having a temperature sensing unit for sensing or detecting the temperature of a vessel being heated, the materials of fabrication of said temperature sensing unit not being restricted in the same way as in prior art electric and gas ranges.

Another object of the invention herein set forth is the provision of a cooking appliance having a temperature sensing unit for sensing or detecting the temperature of the vessel or utensil being heated, said temperature sensing unit not requiring thermal shielding or insulation in the ways or to the extent employed in prior art electric or gas ranges.

Another object of the invention herein set forth is the provision of a cooking appliance having a temperature sensing unit for sensing or detecting the temperature of a vessel or utensil being heated, said temperature sensing unit being capable of accurately sensing the temperature of the vessel regardless of whether said vessel be of light weight and/or whether the vessel has an irregular surface; said temperature sensing unit not requiring the prior art spring construction or arrangement.

Another object is to provide a vessel support means, such as a counter which has an uninterrupted top or working surface.

The invention illustratively embodied as hereinafter described attains the aforementioned objects, inter alia, in that there is provided an induction cooking appliance for heating a vessel or utensil having at least one portion thereof in which electric current may be induced for the purpose of heating said one portion. The cooking appliance is comprised of a vessel supporting means, such as a counter made of a material, or materials, in which no substantial current is induced when the supporting means is subjected to a changing magnetic field. The supporting means has a surface on which the cooking vessel or utensil is supported and, in addition, there is, according to one embodiment of the invention, provided a passage through the vessel supporting means defining at one end of the passage a first opening terminating in said surface and a second opening at another end of the passage. The vessel is rested on the surface of the supporting means whereby said one portion of the vessel covers said first opening, said one portion of said vessel being in communication, through the passage, with the second opening. Also provided is an induction coil which is energizable for generating a changing magnetic field within which said one portion of the cooking vessel is located whereby electric current is induced in this one portion thereby heating said one portion. A source of electric power of at least ultrasonic frequency is provided for energizing the induction coil. Also provided is a temperature sensing unit comprising radiant heat detection means located proximate said second opening for receiving through said passage radiant heat energy from said one portion of the vessel, or utensil, at the first opening whereby the temperature of the cooking vessel is determinable.

In accordance with another embodiment of the invention herein disclosed, the radiant heat detection means, which may be a bolometer, is remotely located from the second opening and there is coupled therebetween the second opening and the radiant heat detection means radiant heat energy propagation means.

In still another embodiment no passage is provided in the vessel supporting means. Instead the vessel supporting means propagates radiant heat energy.

Other objects as well as a fuller understanding of the invention will appear by referring to the following detailed description, claims, and drawing figures.

DESCRIPTION OF THE DRAWING FIGURES

DESCRIPTION OF PREFERRED EMBODIMENT(S)

Figure 1:
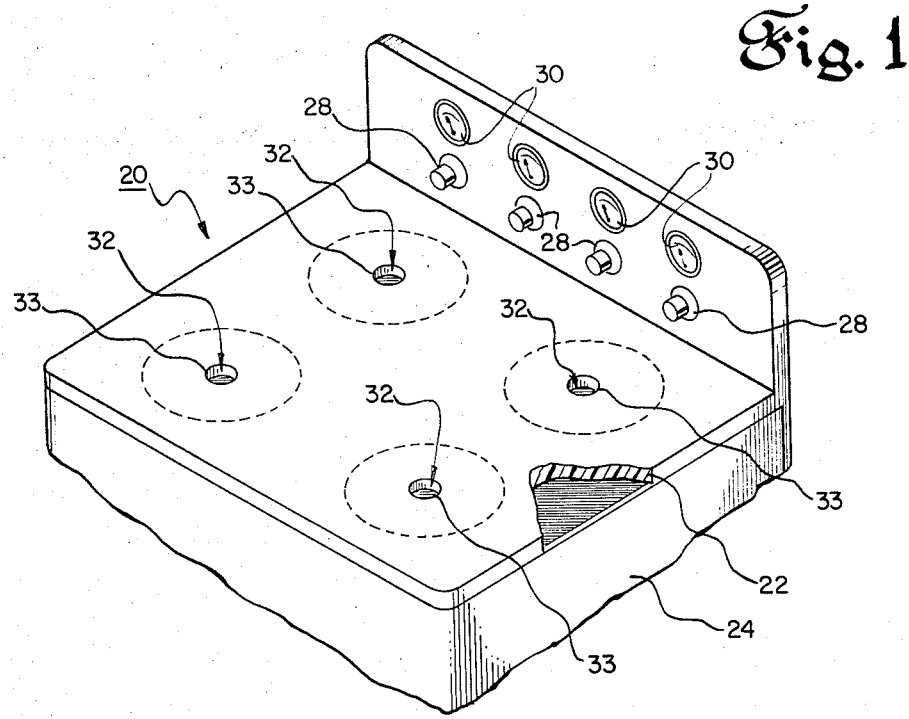
FIG. 1 is a perspective view of an upper part of an induction cooking range showing, among other things, a range counter and the top or working surface thereof.
Figure 2:
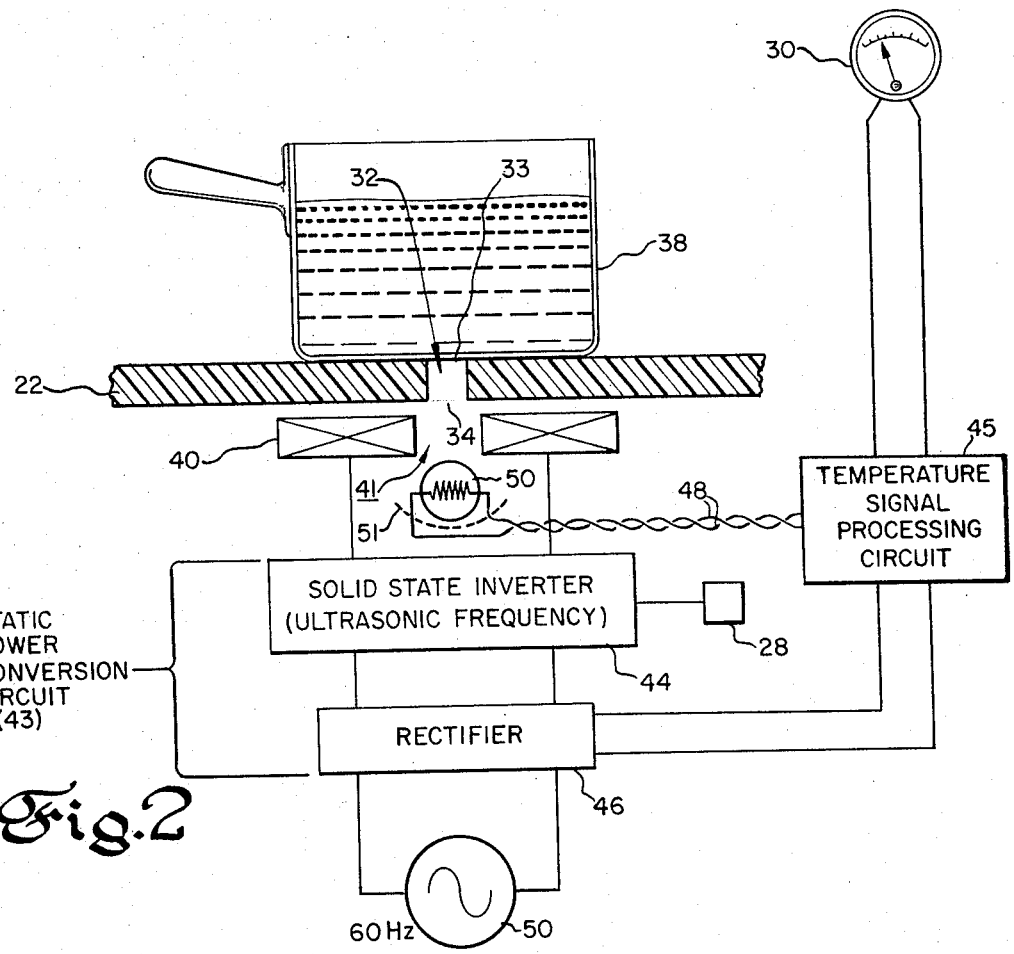
FIG. 2 is, in part, a block diagram of a portion of the induction cooking range of FIG. 1 showing, among other things, an enlarged cross section of a cooking vessel resting on the range counter proximate to the temperature sensing unit therein; an induction coil being located below the range counter.

Shown in FIG. 1 is an induction cooking range designated generally by the reference number 20. The range 20 is provided with a counter 22 which is suitably supported on a range substructure 24. Fastened to substructure 24 and located at the rear of counter 22 is a panel 26. As shown, on panel 26 there is mounted a number of controls 28 and like number of thermometers 30. On the top or working surface of the counter 22 there is shown four dotted line circles. These circles are intended to suggest locations where four cooking vessels (e.g., pots, pans, etc.) may be positioned for cooking. At the center of each of the dotted line circles in counter 22 there is located a passage or aperture designated generally by the reference number 32. The passage or aperture 32 extends completely through the counter 22, as shown at FIG. 2, to define a first opening 33 in the top surface of the counter and a second opening 34 at the bottom surface of the counter.

Resting on the top surface of counter 22 is a cooking vessel 38. As shown in FIG. 2, the bottom surface of the vessel 38 covers the first opening 33. Located below counter 22 and separated from the bottom surface thereof by an air gap is a relatively flat spiral induction coil 40. As shown in FIG. 2 the induction coil 40 has at the center thereof an air core designated generally by the reference number 41. Also, as indicated, the air core 41 is directly in line with passage 32.

The coil 40 is electrically coupled to the output of a solid state inverter 44 which, in turn, has an input which is electrically coupled to the output of a rectifier 46. Inverter 44 is a solid state inverter and as combined with the rectifier 46 forms a static power conversion circuit designated generally by the reference number 43. Rectifier 46 includes an input which is electrically coupled to a conventional A.C. source 50 which is a 60 Hz, single phase, 110 or 220 volt source. More specific details of the static power conversion circuit 43 including rectifier 46 and inverter 44 may be had by referring to the patent applications hereinbefore noted under the heading CROSS REFERENCES TO RELATED APPLICATIONS. Also shown in FIG. 2 is a control 28 which may, for example, be a switch which is electrically coupled with inverter 44 for the purpose of controlling the flow of power to induction coil 40. The control 28 is preferably marked in °F settings to enable the housewife, for example, to call for a particular temperature, or temperature range, performance. However, the thermometer 30, associated with a particular control 28, which provides a visible indication of actual temperature of the vessel 38, as well as of rate of temperature rise and fall.

Suffice it to say: the rectifier 46 may be a regulated full-wave bridge rectifier employing solid state devices and operating to convert A.C. input power to D.C. output power and inverter 44 employs SCR's which, in the performance of their control switching function, enable inverter 44 to deliver relatively high frequency (i.e., ultrasonic or above) output power to drive the induction coil 40.

Also shown at FIG. 2 is a temperature signal processing circuit 45 which includes: a first input coupled to the rectifier 46 and deriving therefrom a source of D.C. voltage; a second input in the form of a pair of twisted electrical conductors 48 extending from a bolometer 50 to the signal processing circuit 45; and, an output directly coupled to a thermometer 30. Thermometer 30 may be, as shown a dial type electrical thermometer suitably graduated. The bolometer 50 which is the temperature sensor employed herein for purposes of illustration may be of the type which employs germanium or silicon thermistor material having an appropriate temperature coefficient of resistance. The thermistor-type bolometer 50 changes its resistance as a function of temperature change; principally, in response to the radiant heat energy which is directed thereto by that portion of the heated vessel 38 which covers the opening 33 of the passage 32; the radiant energy path from vessel 38 traversing opening 33, passage 32, opening 34 and air core 41 to the bolometer 50. In FIG. 2, there is a reflector means 51 shown next to bolometer 50. Reflector means 51 functions to gather, or collect, radiant heat energy waves from vessel 38 and to concentrate and reflect these waves to the bolometer 50. The temperature-varied impedance of the bolometer 50 enables the temperature signal processing circuit 45 to deliver a signal corresponding to temperature change to the thermometer 30. The bolometer 50 is discussed in more detail hereinafter.

At FIG. 2, vessel 38 is shown as being filled with a liquified food, or slurry, which is to be heated. Vessel 38 in a conventional pot which may be made of cast iron, magnetic stainless steel, etc.; i.e., an electrically conductive metal or alloy in which electrical heating current may be induced by action of the change in magnetic field produced therein by the induction coil 40. Because induction heating is used, the vessel 38 and the conductor 22 are not heated to a temperature higher than about 550°F. In stating 550°F some margin for safety is included. Hence, counter 22 may be fabricated from materials which are not usable in conventional electrical or gas ranges. For example, counter 22 may be fabricated from epoxies, plastics, polymides, glass treated to withstand temperatures of 550°F, etc. If required for purposes of electrostatic shielding and/or structural enhancement and/or decoration, the counter 22 may include some metallic content. However, the inclusion of metallic material is necessarily limited to a small amount in order to permit substantially all of the power developed by the induction coil 40 to be coupled to the cooking vessel 38.

As shown in FIG. 2, the bolometer 50 is located proximate to and in line with the air core 41 of induction coil 40. The air core 41 is, in turn, directly proximate to and directly in line with passage 32 in the counter 22. Thus, bolometer 50, core 41 and passage 32 are in register, or are aligned on a common axis. Along this common axis the changing magnetic field produced by the coil 40 is at a relatively low intensity. Advantageously, the bolometer 50 is not spuriously heated to a significant degree by induction coil 40 for two reasons: first, because it is located in a region (near core 41) of relatively low magnetic field intensity; and, second, because it is comprised of materials (some of which are hereinafter specified as illustrative examples) in which, at best, only insignificant heating currents may be induced. The conductors or leads 48 extending from bolometer 50 to the signal processing circuit 45 are twisted as shown for the purpose of cancelling such heating currents as may be induced therein. As may be appreciated from the foregoing and from FIG. 2, the temperature measured by bolometer 50 is essentially the temperature of that portion of the vessel 38 which it "sees" through the core 41 and passage 32.

Unlike prior art electric and gas ranges, the bolometer 50 is free of the rather extensive thermal shielding or insulation that is usually required with the temperature sensing units used in such ranges because, as hereinbefore stated, spurious heating of bolometer 50 by the coil 40 is, at best, insignificant. Moreover, because of the absence of spurious heating, the bolometer 50 is not subjected to severe thermal stresses. Hence, many materials, such as germanium and silicon, not usable with the conventional prior art electric and gas ranges may be used in the various parts of bolometer 50. Advantageously, by using bolometer 50 or a like radiation detection means in the manner suggested at FIG. 2, the massive spring arrangement required with prior art electric and gas ranges is not required. As a result, the vessel 38 may rest unobstructedly on the surface of counter 22 and regardless of its weight, or lack of sufficient weight, it is positioned on the counter 22 so as to receive the maximum possible energy which may be coupled thereto from the induction coil 40. Another beneficial aspect achieved by employing the bolometer 50 is that the temperature of the vessel 38 may be accurately detected by bolometer 50 even in the event that, by design or by accident, the bottom surface of vessel 38 should have an irregular shape. As stated hereinbefore, such is not always the case with the prior art electric and gas ranges.

Figure 3:
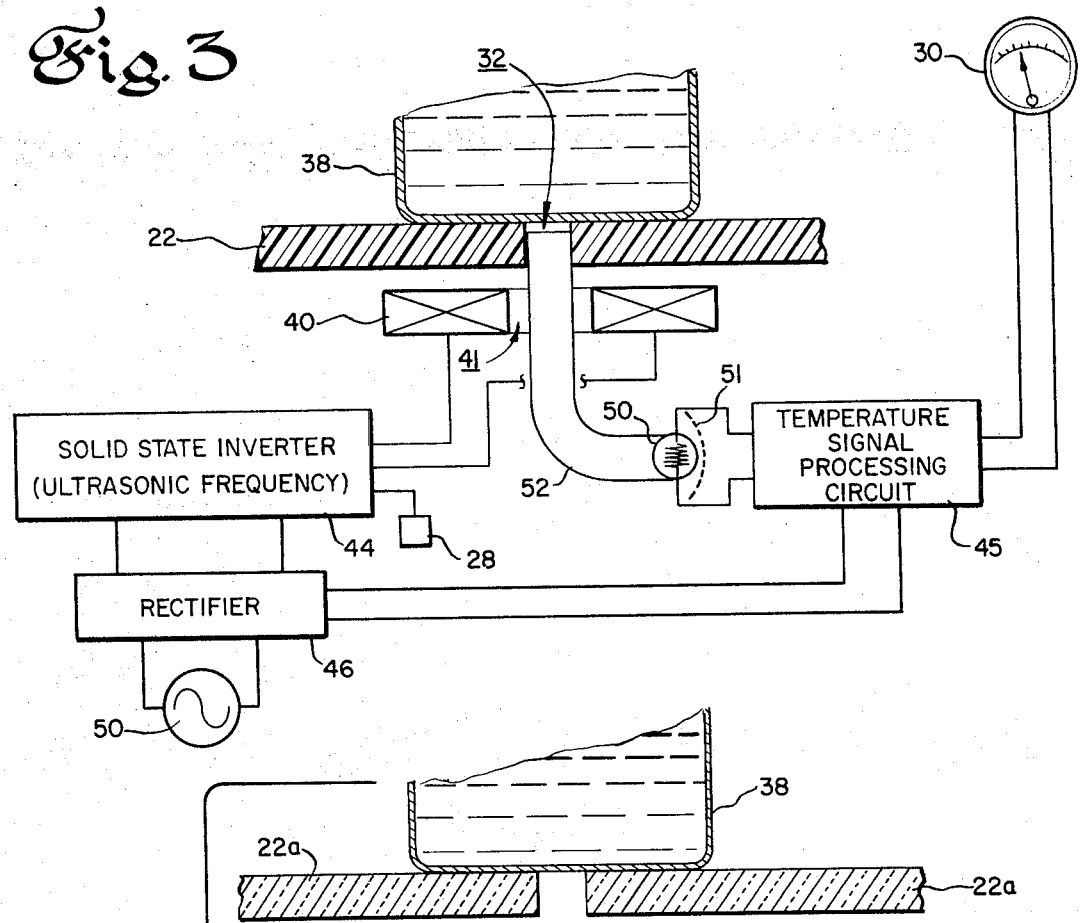
FIG. 3 is a view similar to that of FIG. 2, but illustrating a modification of the embodiment of FIG. 2.

In FIG. 3 there is illustrated a modification of the arrangement shown in FIG. 2. For the purpose of locating the bolometer 50 at quite a remote distance from induction coil 40 there is coupled between the bolometer 50 and the surface of vessel 38 a radiant energy propagation conduit 52, or focusing means. As shown in FIG. 3, the conduit or means 52 is a hollow member having two open ends. One end is received in the passage 32 of counter 22 and is in communication with the bottom surface of vessel 38. The other end of the pipe 52 terminates in communication with the remotely located bolometer 50. Hollow pipe 52 may be a nonmetallic member made of one or more of the materials hereinbefore set forth; e.g., plastic, epoxies, polymides, ets. Also, if desired the inside surface of pipe 52 may be coated with reflective material. Hence, except for the addition of the pipe 52 and remotely locating the bolometer 50 the embodiment of the invention illustrated at FIG. 3 is substantially the same as that shown at FIG. 2.

Moreover, the embodiment illustrated at FIG. 3 incorporates at least all of the advantageous aspects hereinbefore discussed with reference to the embodiment disclosed at FIG. 2; i.e., the elimination of spurious heating, the elimination of extensive thermal shielding, and the elimination of massive and complicated spring arrangements. In addition, the pipe 52 may be made of a material or materials which would not be employable in the conventional prior art electric and gas ranges.

As an alternative, the means 52 may be a solid quartz rod arranged as shown in FIG. 3 partly within the passage in counter 22. Advantageously, the solid quartz rod will propagate heat energy from vessel 38 to bolometer 50. A special advantage to be gained from using a solid quartz rod for means 52 is that solid quartz in combination with counter 22 (as the end of quartz rod fills passage 32) provides an uninterrupted work surface on top of counter 22.

Figure 4:
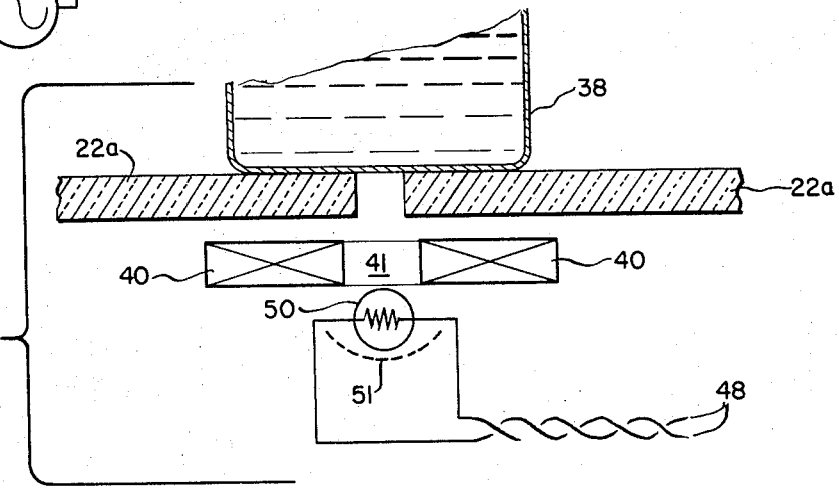
FIG. 4 is a view similar to that of FIG. 2 but showing a range counter of special material, said counter not having a passage therein.

Also, at FIG. 4 there is illustrated another embodiment wherein the counter 22 of FIG. 2 is replaced by a new counter 22a which is fabricated from a material which will propagate heat energy. One such material is quartz. Advantageously, a passage, such as 32, through a counter is not needed and the counter 22a has a smooth uninterrupted, top or working surface.

Although the invention has been described and illustrated by way of specific embodiments thereof, it is to be understood that many changes in details of construction as well as in the combination and arrangements of parts or components may be made without departing from the spirit and scope of the invention as it is hereinafter claimed.

What is claimed is:

1. An induction cooking appliance, for heating a vessel having at least one portion thereof in which electric current may be induced to heat said one portion, comprising: vessel supporting means comprising material in which no substantial amount of current is induced when said supporting means is subjected to a changing magnetic field, said supporting means including a surface on which said vessel is supportable and a passage which extends through said supporting means, said passage defining at one end thereof a first opening terminating at said surface and a second opening at another end of said passage, said one portion of said vessel being adjacent said first opening as said vessel is supported on said surface of said supporting means; an induction coil energizable for generating a changing magnetic field whereby electric current is induced in said one portion to heat said one portion, said one portion radiating energy in response to the heating thereof through said first opening, said passage and said second opening; means for energizing said coil with electric power of at least ultrasonic frequency; radiant energy detection means for receiving the energy radiated through said second opening; and, means coupled with said detection means for providing a signal representative of the temperature of the energy-radiating one portion.

2. The appliance according to claim 1 wherein said radiant energy detection means includes a bolometer.

3. The appliance according to claim 1 wherein said radiant energy detection means includes a radiant energy propagation means and a bolometer, said propagation means having an end thereof in communication with at least said second opening and another end thereof in communication with said bolometer whereby energy radiating from said one portion is transmitted to said bolometer by way of a path comprising said second opening and said propagation means.

4. An induction cooking appliance, for heating a cooking vessel having at least one portion thereof in which heating current may be induced to heat said one portion whereby the heated one portion radiates heat energy, comprising: vessel supporting means in which no substantial heating current is induced when said supporting means is subjected to a changing magnetic field, said supporting means including a passage therethrough defining first and second openings at opposing ends of said passage, said supporting means being adapted for having said vessel supported thereby with at least a part of said one portion of said vessel being proximate said first opening and radiating heat energy through said first opening, said passage and said second opening; an induction coil energizable for generating a changing magnetic field in said one portion of said vessel supported by said supporting means; means for energizing said coil with electric power of at least ultrasonic frequency; and, detection means receiving the radiant heat energy from said second opening for determining the temperature of said part of said one portion of said vessel.

5. The appliance according to claim 4 wherein said induction coil includes an air core which is proximate said second opening and wherein said detection means is proximate said air core and receives radiant heat energy which is propagated through said air core from said second opening.

6. The appliance according to claim 4 further comprising: radiant heat energy propagation means having first and second opposing end portions, said first end portion being received in said passage and terminating at said first opening, the remainder of said propagation means extending from said passage through said second opening to a location remote from said supporting means and said induction coil whereat said second end portion of said propagation means is proximate said detection means.

7. The appliance according to claim 6 wherein said detection means is a bolometer.

8. The appliance according to claim 4 wherein said detection means is a bolometer.

* * * * *

UNITED STATES PATENT OFFICE
CERTIFICATE OF CORRECTION

Patent No. 3,781,504    Dated Dec. 25, 1973

Inventor(s) John D. Harnden, Jr.

It is certified that error appears in the above-identified patent and that said Letters Patent are hereby corrected as shown below:

or the claims in this patent read the following:

1. An induction cooking appliance, for heating a vessel having at least one portion thereof in which electric current may be induced to heat said one portion, comprising: vessel supporting means comprising material in which no substantial amount of current is induced when said supporting means is subjected to a changing magnetic field, said supporting means including a surface on which said vessel is supportable and a passage which extends through said supporting means, said passage defining at one end thereof a first opening terminating at said surface and a second opening at another end of said passage, said one portion of said vessel being adjacent said first opening as said vessel is supported on said surface of said supporting means; and induction coil energizable for generating a changing magnetic field whereby electric current is induced in said one portion to heat said one portion, said one portion radiating energy in response to the heating thereof through said first opening, said passage and said second opening; means for energizing said coil with electric power of at least ultrasonic frequency; radiant energy detection means including radiant energy propagation means for receiving the energy radiated through said second opening; and, means coupled with said detection means for providing a signal representative of the temperature of the energy-radiating one portion; said propagation means having an end thereof in communication with at least said second opening and another end thereof in communication with said radiant energy detection means whereby energy radiating from said one portion is transmitted to said radiant energy detection means by way of a path comprising said second opening and said propagation means.

2. An induction cooking appliance, for heating a cooking vessel having at least one portion thereof in which heating current may be induced to heat said one portion whereby the heated one portion radiates heat energy, comprising: vessel supporting Patent No. 3,781,504 means in which no substantial heating current is induced when said supporting means is subjected to a changing magnetic field, said supporting means including a passage therethrough defining first and second openings at opposing ends of said passage, said supporting means being adapted for having said vessel supported thereby with at least a part of said one portion of said vessel being proximate said first opening and radiating heat energy through said first opening, said passage and said second opening; an induction coil energizable for generating a changing magnetic field in said one portion of said vessel supported by said supporting means; means for energizing said coil with electric power of at least ultrasonic frequency; detection means receiving the radiant heat energy from said second opening for determining the temperature of said part of said one portion of said vessel; and radiant heat energy propagation means having first and second opposing end portions, said first end portion being received in said passage and terminating at said first opening, the remainder of said propagation means extending from said passage through said second opening to a location remote from said supporting means and said induction coil whereat said second end portion of said propagation means is proximate said detection means.

. The appliance according to claim 2 wherein said detection means is a bolometer.

. The appliance according to claim 1 wherein said detection means is a bolometer.

Signed and sealed this 3rd day of December 1974.

(SEAL)
Attest:

McCOY M. GIBSON JR.
Attesting Officer

C. MARSHALL DANN
Commissioner of Patents